United States Patent
Ali et al.

(10) Patent No.: US 6,307,173 B1
(45) Date of Patent: Oct. 23, 2001

(54) WELD GUN ARM CASTING

(75) Inventors: Sabit Ali, Perrysburg, OH (US); David D. Brown, Bradenton, FL (US); A Murray Patterson, Perrysburg, OH (US)

(73) Assignee: Brush Wellman, Inc., Cleveland, OH (US)

( * ) Notice: Subject to any disclaimer, the term of this patent is extended or adjusted under 35 U.S.C. 154(b) by 0 days.

(21) Appl. No.: 09/742,594

(22) Filed: Dec. 21, 2000

(51) Int. Cl.$^7$ ..................................................... B23K 9/32
(52) U.S. Cl. .................. 219/86.25; 219/86.1; 219/78.01; 420/494
(58) Field of Search .............. 219/86.25, 86.1, 219/78.01; 420/494, 485, 469

(56) References Cited

U.S. PATENT DOCUMENTS

| | | | |
|---|---|---|---|
| 1,957,214 | * 5/1934 | Horstkotte | ................. 219/4 |
| 2,038,390 | * 4/1936 | Silliman | ................. 219/4 |
| 2,094,784 | * 10/1937 | Bremer | ................. 219/2 |
| 3,811,611 | * 5/1974 | Tholander et al. | ................. 226/178 |
| 4,594,116 | * 6/1986 | Inagaki | ................. 148/12.7 C |
| 6,011,237 | * 1/2000 | Yang | ................. 219/119 |

OTHER PUBLICATIONS

Woldman's Engineering Alloys, ASM International 1994 8th edition p. 1354.*

John C. Harkness et al., "Beryllium–Copper and Other Beryllium–Containing Alloys," *Metals Handbook*, vol. 2, 10 Ed, ©1993 ASM International.

* cited by examiner

*Primary Examiner*—M. Alexandra Elve
(74) *Attorney, Agent, or Firm*—Calfee, Halter & Griswold, LLP

(57) ABSTRACT

An alloy for making weld gun arm castings comprises about 0.35 to 0.8 wt. % Be, about 0.2 to 0.9 wt. % Co and about 1.5 to 2.4 wt. % Ni, with the balance being Cu and incidental impurities, the (Ni+Co)/Be ratio in the alloy being at least about 4.

11 Claims, 1 Drawing Sheet

WELD GUN ARM CASTING

BACKGROUND OF THE INVENTION

1. Field of Invention

The present invention relates to weld gun arm castings useful in robotic welding.

2. Background

Robotic welding is widely used in modern automotive assembly lines for joining a variety of different parts. In a typical robotic welder, heat for welding is generated by a resistance electrode mounted in a weld gun arm. Since electricity is supplied to the electrode directly through the weld gun arm, the weld gun arm must be designed to carry a high electrical load. In addition, it must be strong and shock resistant. In addition, it must exhibit these properties over a long useful life, as most weld gun arms are designed for making as many as 1 million or more welds.

Accordingly, current industrial specifications call for the best weld gun arms in use today, known as "Class III RWMA" weld gun castings ("RWMA refers to the Resistance Welding Manufacturers' Association), to be made from materials having a minimum Rockwell Hardness of 90B and a minimum electrical conductivity of 45% IACS.

Because of these demanding requirements, and because of their complex shape, most weld gun arms used in the North America automotive industry are made from cast, precipitation hardened copper alloys of the following composition:

| Alloy | Be wt. % | Co wt. % | Ni wt. % | Balance |
|---|---|---|---|---|
| Class III (GM/Ford) | .35–.80 | none | 1.80–2.0 | Cu |
| Class III (Daim/Crys) | .35–.50 | none | 1.30–1.60 | Cu |

See, in particular, Harkness et al., Beryllium-Copper and Other Beryllium-Containing Alloys, *Metals Handbook*, Vol. 2, 10th Edition, ©1993 ASM International, which indicates that alloys having high electrical conductivities as well as excellent strength and hardness can be made by adding small amounts of beryllium and nickel to copper metal and then precipitation hardening the alloy so obtained.

Weld gun arms are supplied industrially by fabricators who design different gun arms for different applications. In normal practice, these fabricators also manufacture their own weld gun arms from molten alloys prepared by them. That is, the fabricators prepare one of the above alloys, usually from pure copper metal, pure nickel and a BeCu master alloy containing 4% Be obtained from a beryllium supplier. The fabricator then casts the alloy into a near net shape article—i.e., a casting whose shape is very close to the final shape of the ultimate product desired. The near net shape casting is then worked such as by drilling, cutting or bending to produce the product weld gun arm casting. Precipitation hardening is usually done after fabrication is complete, although it can be done before final shaping if desired.

A significant problem facing the robotic welding industry is premature weld gun arm failure. Most weld gun arm castings are designed for a predetermined useful life such as 1 million or more welds. Many achieve this goal. However, many crack or break long before their useful lives have expired. This often requires shut down of production lines as well as expensive replacement of parts.

Accordingly, it is an object of the present invention to provide new technology for reliably and consistently making weld gun arm castings which not only exhibit the strength, hardness and electrical conductivity of currently available product but also avoid premature failure.

In addition, it is a further object of the present invention to provide new weld gun castings which exhibit the strength, hardness and electrical conductivity of currently available product and, in addition, superior fatigue resistance as compared to currently available product.

SUMMARY OF THE INVENTION

These and other objects are accomplished by the present invention which is based on the discovery that premature failure of BeNiCu weld gun arm castings can be substantially avoided, without sacrificing strength, hardness or electrical conductivity, by including cobalt in the casting and further by controlling the (Ni+Co)/Be ratio in the casting to be about 4 or greater.

Thus, the present invention provides a new BeCu alloy for making weld gun arm castings comprising about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being at least about 4.

In addition, the present invention provides a new weld gun arm casting comprising an unwrought body of complex shape having a distal end for mounting a resistance electrode and a proximal end for attaching to the robotic assembly of a robotic welder, the casting being made from a BeNiCu alloy comprising about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being at least about 4.

In addition, the present invention provides a new process for reliably and consistently producing weld gun arm castings exhibiting excellent fatigue resistance and long useful lives, the process comprising forming the castings from a BeNiCu alloy comprising about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being about 4.

BRIEF DESCRIPTION OF THE DRAWINGS

The present invention may be more readily understood by reference to the following drawings wherein.

DETAILED DESCRIPTION

In accordance with the present invention, weld gun arm castings which exhibit excellent fatigue resistance and long useful lives, as well as good strength, hardness and electrical conductivity, can be reliably and consistently made by forming the casting from a BeNiCu alloy comprising about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being about 4 or more.

Weld Gun Arm Casting Structure

Figure 1:
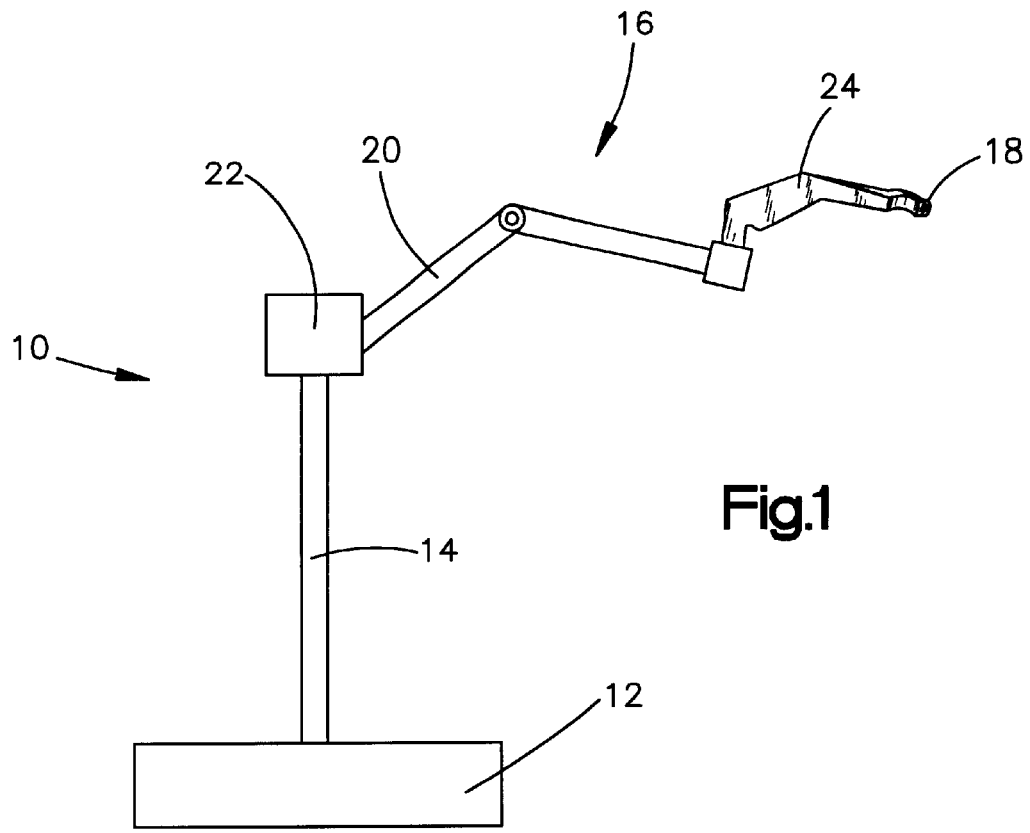
FIG. 1 is a schematic diagram of a robotic welder made with an improved weld gun casting made in accordance with the present invention.
Figure 2:
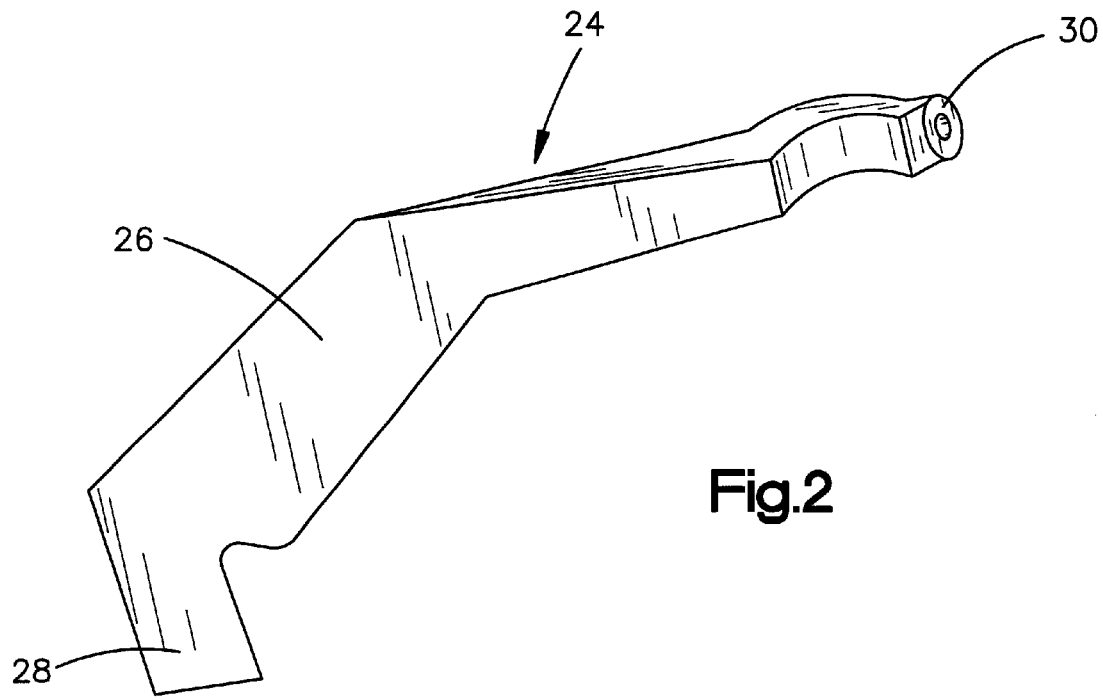
FIG. 2 is a schematic diagram of an improved weld gun casting made in accordance with the present invention.

FIGS. 1 and 2 schematically illustrate the structure of a typical weld gun arm casting as well as a robotic welder made with such a casting.

As shown in FIG. 1, a robotic welder generally indicated at 10 is composed of base or foundation 12, support structure 14 and a robotic assembly generally indicated at 16. Robotic assembly 16 includes moveable or articulated extension member 20 for supporting resistance electrode 18 and motor 22 for moving extension member 20 into and out of its welding position. At its distal end, extension member 20 carries weld gun arm 24, which in turn mounts resistance electrode 18. Electrical cables (not shown) are carried by extension member 20 for supplying electrical current to resistance electrode 18 via weld gun arm 24.

As illustrated in FIG. 2, a typical weld gun arm 24 is composed of an unwrought casting 26 having a proximal end 28 for mounting in extension member 20 and a distal end 30 for carrying resistance electrode 18. As in the case of practically all industrially-used weld guns, weld gun arm 24 is complex in shape. That is to say, weld gun arm 24 does not have an essentially uniform cross-sectional shape along most or all of its length. Rather, its cross-sectional shape varies considerably along its length.

In effect, this means that weld gun arm 24 can only be made, as a practical matter, by a casting process in which a near net shape article is first made and then this near net shaped article is subjected to minor machining, if necessary, to achieve to the desired final shape. In this context, "near net shape article" means an article which, in the as cast condition, has a shape the same as or very similar to the final product shape desired so that the additional machining needed to achieve final shape is minor. Weld gun arm 24 (and other articles of complex shape) cannot normally be made by processes involving significant working of the alloy, since there is no practical, economic way of working such articles.

In this connection, it is well known that the mechanical properties of many precipitation hardenable alloys can be enhanced significantly if, before precipitation hardening, the alloy is subjected to significant uniform, mechanical deformation, i.e. "working." See the above-noted Harkness et al. article, for example. Accordingly, most products of simple shape which are formed from precipitation hardenable alloys are worked significantly before precipitation hardening. Products of complex shape, however, cannot normally be made in this way, since the conventional processes used for working—rolling, forging and extrusion—achieve products with uniform cross-sectional shape. Accordingly, articles of complex shape, such as weld gun arm 24, are almost always unwrought when in final form—i.e. when ready for commercial use.

Therefore, it will be understood that the inventive weld gun arm castings as well as the alloys from which they are made are unwrought, meaning they have not been "worked" when production of the inventive weld arm guns is complete and they are ready for commercial application.

Alloy Chemistry

The alloys used to form the inventive weld gun arm castings comprise about 0.35 to 0.80, more typically 0.4 to 0.7 and especially 0.5 to 0.6 wt. % Be; about 0.2 to 0.9, more typically 0.3 to 0.8, and even 0.4 to 0.6 wt. % Co; and about 1.5 to 2.4, more typically 1.7 to 2.2, and even 1.8 to 2.0 wt. % Ni, with the balance being Cu and incidental impurities. To this end, the inventive alloys should contain no more than about 0.15 wt. % Si, 0.10 wt. % Fe, 0.10 wt. % Al, 0.10 wt. % Sn and 0.05 wt. % each Zn, Cr, Pb. In addition, the inventive alloys may include small amounts of additional ingredients for enhancing alloy properties. For example, the inventive alloys can contain 0.05 to 0.50 wt. % Zr for enhancing strength properties at elevated temperatures, and 0.02 to 0.20 wt. % Ti for enhancing grain microstructure.

In accordance with the present invention, it has been found that by including cobalt in unwrought alloys typically used for making Class III weld gun arm castings, and also by controlling the (Ni+Co)/Be ratio of such alloys to at least about 4, unwrought weld gun arm castings with desirably long useful lives can be obtained reliably and consistently. Alloys having a (Ni+Co)/Be ratio of about 4 to 7, more typically about 4.5 to 6 are desirable.

Although not wishing to be bound to any theory, it is believed that the primary failure mode of defective weld gun arm castings of conventional design is stress fatigue cracking along grain boundaries of the metal. This problem, which is due to poor and inconsistent casting microstructure, is avoided in accordance with the present invention by forming the casting from an alloy having superior stress fatigue cracking resistance. Unwrought BeCu alloys containing Ni and further containing suitable amounts of Co, as indicated above, and also having (Ni+Co)/Be ratios of at least about 4 have been found in accordance with the present invention to exhibit this superior stress fatigue cracking resistance even though they also exhibit the same strength, hardness and electrical conductivity characteristics as unwrought alloys made by conventional technology.

WORKING EXAMPLES

In order to more thoroughly describe the present invention, the following working examples are provided:

Examples 1 to 4

Four test specimens machined to 0.50 inch diameter reduced section with a 1.4 inch gauge length and overall sample length being approximately 6 inches were made by casting molten alloys into molds and then removing the test specimens from their molds. Samples castings were solution annealed at 1650 degrees F., water quenched, and precipitation hardened for 3 hours at 900 degrees F. The unwrought test specimens were then subjected to the tests recited in the following Table 1 to determine their properties.

TABLE 1

| Properties and Test Methods | | |
|---|---|---|
| Property | Test Method | Unit |
| Ultimate Tensile Strength | ASTM E8 | Ksi |
| Yield Strength | ASTM E8 | Ksi |

TABLE 1-continued

Properties and Test Methods

| Property | Test Method | Unit |
|---|---|---|
| Ductility | ASTM E8 | % Elongation |
| Hardness | ASTM E18 | Rockwell B scale |
| Electrical Conductivity | ASTM B193 | % IACS |
| Fatigue Life @ 22–24 ksi | R.R. Moore Fatigue Test | Cycles |

The compositions of the alloys from which the test specimens were made, and the results obtained are set forth in the following Table 2:

TABLE 2

Properties of Examples 1 to 4

| Example | Be | Co | Ni | CoNi/Be | UTS Ksi | YS ksi | El % | HRB | % IACS | Fatigue Strength 22–24 ksi |
|---|---|---|---|---|---|---|---|---|---|---|
| 1 | .50 | .30 | 1.98 | 4.56 | 86 | 57 | 15.8 | 96.9 | 52.6 | $4.6 \times 10^7$ |
| 2 | .45 | .50 | 1.76 | 5.0 | 84 | 56 | 14.1 | 94.6 | 55.1 | $6.5 \times 10^7$ |
| 3 | .50 | .30 | 1.98 | 4.56 | 86 | 57 | 15.8 | 96.9 | 52.6 | $7.0 \times 10^7$ |
| 4 | .48 | .50 | 1.88 | 4.95 | 87 | 69 | 11.5 | 96.9 | 52.6 | $3.5 \times 10^7$ |

* All tables reflect chemical analysis given as an element weight percentage.

From Table 2, it can be seen that each alloy in accordance with the present invention exhibited a Rockwell B hardness of 95 or above and an electrical conductivity of over 50% IACS. In addition, each alloy also exhibited a fatigue life of at least 3.5 million cycles when subjected to a cyclical applied stress of 22 to 24 ksi. This means that these alloys not only exceeded current industrial specifications for Class III RWMA weld gun castings—i.e. a Rockwell B Hardness of at least 90 and an electrical conductivity of at least 45% IACS.—but also exhibited far greater fatigue life than alloys currently used for making weld gun castings.

Comparative Examples A to E

Examples 1 to 4 were repeated, except than the compositions of the alloys used to make the test specimens were similar to but outside of the requirements of the present invention. The results obtained are set forth in the following Table 3.

As can be seen from Table 3, the alloy of Comparative Example C exhibited the best combination of properties. Nonetheless, this alloy still failed to meet current industrial specifications for Class III RWMA weld gun castings, because its hardness was too low. Similarly, the alloys of Comparative Examples D and E failed to meet current industrial specifications for Class III RWMA weld gun castings, because their electrical conductivities were inadequate. The alloys of Comparative Examples A and B, on the other hand, did meet the hardness and electrical conductivity requirements of these standards. Nonetheless, both of these alloys exhibited poor fatigue strength, as did Comparative Alloys D and E, as well. Accordingly, while the alloys of Comparative Examples A and B met current industrial specifications Class III RWMA weld gun castings, they nonetheless would make less-than-ideal commercial product since weld gun castings made from these alloys would be subject to premature stress-cracking failure.

Comparative Examples F to Q

A number of commercially-used weld gun arm castings that had prematurely failed in commercial use were visually inspected to determine their modes of failure. In additions, the various other properties of the alloys from which these gun arm castings were made were also determined by the test methods mentioned above. The compositions of the various alloys, and the results obtained, are set forth in the following Table 4:

TABLE 3

Properties of Comparative Examples A to E

| Example | Be | Co | Ni | CoNi/Be | RHB | % IACS | UTS | YS | El % | Fatigue Cycles @ 22,500 psi | Fatigue Cycles @ 23,000 psi |
|---|---|---|---|---|---|---|---|---|---|---|---|
| A | 0.28 | .01 | 1.74 | 6.25 | 98.3 | 63.5 | 83.8 | 73.5 | 6.5 | 321,000 | 760,000 |
| B | 0.33 | .02 | 1.75 | 5.36 | 97.0 | 64.3 | 85.8 | 73.5 | 10.2 | 116,000 | 275,000 |
| C | 0.38 | .01 | 1.74 | 4.58 | 89.1 | 54.8 | 75.3 | 57.6 | 16.3 | NA | 1,700,000 |
| D | 0.60 | .21 | 1.61 | 3.03 | 95.7 | 43.1 | 83.7 | 51.8 | 27.6 | 710,000 | 378,000 |
| E | none | N/A | N/A | N/A | 92.7 | 44.0 | 78.5 | 73.4 | 9.3 | 640,000 | 148,000 |

TABLE 4

Properties of Comparative Examples F to R

| Example | Be | Co | Ni | CoNi/Be | RHB | % IACS | UT | YS | El % | Failure Analysis |
|---|---|---|---|---|---|---|---|---|---|---|
| F | 0.28 | .02 | 1.92 | 6.93 | 94.8 | 54.0 | 76.0 | 65.3 | 5.6 | Large grain structure Shrinkage porosity Intergranular cracking |
| G | 0.28 | .02 | 2.00 | 7.21 | 96.8 | 56.0 | 59.9 | 59.5 | 2.4 | Same |
| H | 0.28 | .02 | 1.96 | 7.07 | 98.0 | 56.0 | 84.9 | 72.5 | 5.2 | Same |
| I | 0.26 | .02 | 2.01 | 7.81 | 97.6 | 44.5 | 24.2 | NA | NA | Large grain structure Shrinkage porosity Brittle fracture |
| J | 0.26 | .02 | 1.98 | 7.69 | 97.0 | 47.0 | 72.6 | 68.6 | 3.2 | Same |
| K | 0.26 | .02 | 1.96 | 7.69 | 97.3 | 49.0 | 81.8 | 74.5 | 3.7 | Same |
| L | 0.28 | .02 | 1.96 | 7.69 | 95.6 | 56.5 | 76.0 | NA | 5.6 | Large grains Fatigue cracks along grain boundaries |
| M | 0.29 | .01 | 1.60 | 5.55 | 91.6 | 49.0 | NA | NA | NA | Fatigue cracks Shrinkage porosity |
| N | 0.18 | .01 | 1.98 | 11.05 | 95.1 | 45.0 | NA | NA | NA | Fatigue cracks Shrinkage porosity |
| O | 0.26 | .01 | 1.95 | 7.54 | 101.3 | 48.0 | NA | NA | NA | Fatigue cracking Inter-dendrite porosity |
| P | 0.22 | .01 | 1.72 | 7.86 | 99.13 | 51.5 | NA | NA | NA | Large grain structure Shrinkage porosity |
| Q | .24 | .01 | 1.90 | 7.91 | 97.4 | 50.0 | — | — | | Large grains Failed in brittle manner |

From Table 4, it can be seen that the alloys forming these commercial weld gun arm castings, although meeting the current industrial specification for hardness and electrical conductivity relative to Class III RWMA weld gun castings, nonetheless exhibited poor microstructures in terms of coarse and non-uniform grain size, as well as increased porosity in terms of both areas affected and severity. These poor microstructures, typically exhibiting lower beryllium content levels and no ratio optimization of the grain refining elements Co and Ni, it is believed, at least partly explain the reason why the gun arm castings made from these alloys failed prematurely.

Although only a few embodiments of the present invention have been described above, it should be appreciated that many modifications can be made without departing from the spirit and scope of the invention. All such modifications are intended to be included within the scope of the present invention, which is to be limited only by the following claims:

We claim:

1. A weld gun arm casting comprising an unwrought body having a distal end for mounting a resistance electrode and a proximal end for attaching to the robotic assembly of a robotic welder, the casting being made from a BeNiCu alloy comprising about 0.35 to 0.8 wt. % Be, about 0.2 to 0.9 wt. % Co and about 1.5 to 2.4 wt. % Ni, with the balance being Cu and incidental impurities, the (Ni+Co)/Be ratio in the alloy being at least about 4.

2. The weld gun arm casting of claim 1, wherein the alloy comprises about 0.4 to 0.7 wt. % Be, about 0.3 to 0.8 wt. % Co and about 1.7 to 2.2 wt. % Ni, with the balance being Cu and incidental impurities, the (Ni+Co)/Be ratio in the alloy being about 4 to 7.

3. The weld gun arm casting of claim 2, wherein the alloy comprises about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being about 4.5 to 6.

4. The weld gun arm casting of claim 1, wherein the unwrought body has a complex shape.

5. The weld gun arm casting of claim 4, wherein the alloy is precipitation hardened.

6. The weld gun arm casting of claim 1, wherein the alloy is precipitation hardened.

7. A process for producing a weld gun arm casting exhibiting excellent fatigue resistance and long useful life, the process comprising forming the casting from a BeNiCu alloy comprising about 0.4 to 0.7 wt. % Be, about 0.3 to 0.8 wt. % Co and about 1.7 to 2.2 wt. % Ni, with the balance being Cu and incidental impurities, the (Ni+Co)/Be ratio in the alloy being about 4 to 7.

8. The process of claim 7, wherein the alloy comprises about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being about 4.0 to 6.

9. The process of claim 8, wherein the alloy comprises about 0.5 to 0.6 wt. % Be, about 0.4 to 0.6 wt. % Co and about 1.8 to 2.0 wt. % Ni, with the balance being Cu and incidental impurities, the (Ni+Co)/Be ratio in the alloy being about 4.5.

10. The process of claim 7, wherein the alloy is molded into a near net shape article and the near net shape article is precipitation hardened without wrought processing first.

11. The process of claim 10, wherein the near net shape article has a complex shape.

* * * * *